Figure 1:
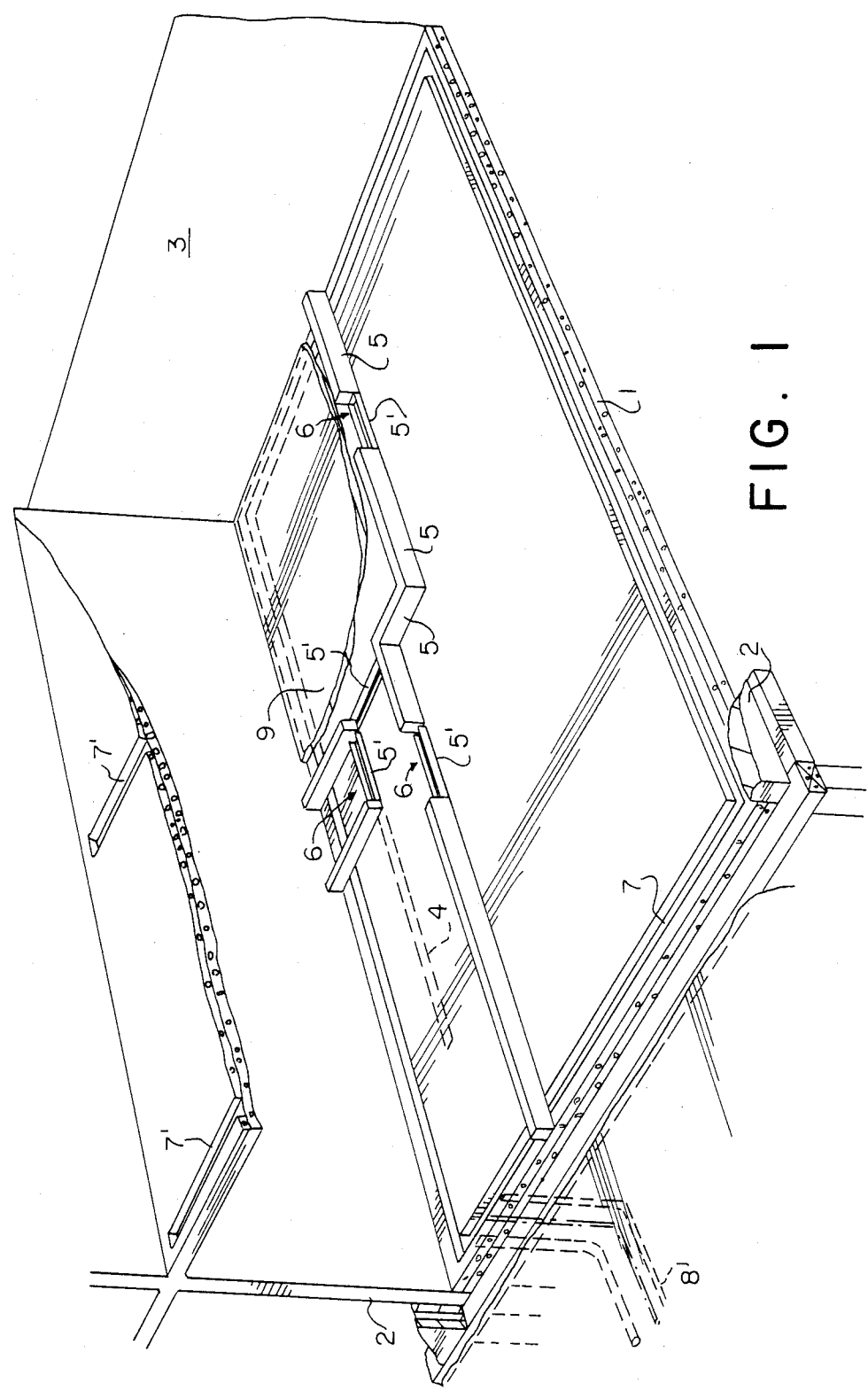

United States Patent [19]

Habraken et al.

[11] Patent Number: 4,984,408

[45] Date of Patent: Jan. 15, 1991

[54] METHOD FOR ARRANGING LINES IN A FLOOR LEVEL TO BE DIVIDED UP INTO SMALLER ROOMS AND ELEMENTS SUITABLE FOR THIS METHOD

[75] Inventors: Nicolaas J. Habraken, Cambridge, Mass.; Age Van Randen, Rotterdam, Netherlands; Franciscus De Vries, Delft, Netherlands; Fokke M. De Jong, Zeist, Netherlands

[73] Assignee: INfill Systems B. V., Delft, Netherlands

[21] Appl. No.: 249,185

[22] PCT Filed: Dec. 16, 1987

[86] PCT No.: PCT/NL87/00038

§ 371 Date: Aug. 11, 1988

§ 102(e) Date: Aug. 11, 1988

[87] PCT Pub. No.: WO88/04713

PCT Pub. Date: Jun. 30, 1988

[30] Foreign Application Priority Data

Dec. 16, 1986 [NL] Netherlands ............... 8603201
May 19, 1987 [NL] Netherlands ............... 8701196

[51] Int. Cl.⁵ ............................................. E04B 1/00
[52] U.S. Cl. ........................................ 52/741; 52/105; 52/220
[58] Field of Search ........... 52/105, 220, 221, 605, 52/603, 236.7, 236.8, 293, 741, 742, 241, 242; 174/48, 49

[56] References Cited

U.S. PATENT DOCUMENTS

| | | | |
|---|---|---|---|
| 2,800,308 | 7/1957 | Parkinson et al. | 52/220 |
| 3,623,288 | 11/1971 | Horowitz | 52/293 X |
| 3,707,817 | 1/1973 | Schmitt et al. | 52/293 X |
| 3,793,793 | 2/1974 | Dobbins | 174/49 X |
| 3,903,666 | 9/1975 | Fork | 174/49 X |
| 4,016,357 | 4/1977 | Abrahamsen | 174/48 |
| 4,147,009 | 4/1979 | Watry | 52/236.8 X |
| 4,576,221 | 3/1986 | Fennesz | 165/49 X |
| 4,773,196 | 9/1988 | Upshida et al. | 52/221 |
| 4,852,315 | 8/1989 | Fukayama | 52/220 |

FOREIGN PATENT DOCUMENTS

| | | | |
|---|---|---|---|
| 1285038 | 12/1968 | Fed. Rep. of Germany | 174/49 |
| 2432273 | 1/1976 | Fed. Rep. of Germany | 52/220 |
| 8602685 | 5/1986 | PCT Int'l Appl. | 52/220 |
| 922886 | 4/1963 | United Kingdom | 52/220 |
| 991606 | 5/1965 | United Kingdom . | |

Primary Examiner—David A. Scherbel
Assistant Examiner—Lan Mai
Attorney, Agent, or Firm—Watson, Cole, Grindle & Watson

[57] ABSTRACT

A method of building construction which involves the steps of forming a building framework that includes a slab-like floor layer having an upper surface defining a habitable area and at least one horizontal groove opening into its lower surface, providing a pattern of duct-like parts on the floor layer in accord with an arbitrarily selected room layout, providing utility lines in the horizontal groove below the upper surface and in the duct-like parts above the upper surface, and providing partition walls atop the duct-like parts to form rooms.

31 Claims, 7 Drawing Sheets

METHOD FOR ARRANGING LINES IN A FLOOR LEVEL TO BE DIVIDED UP INTO SMALLER ROOMS AND ELEMENTS SUITABLE FOR THIS METHOD

The invention relates to a method for arranging lines in a floor level to be divided up into smaller rooms in the case of house and utility building, starting from an unfinished floor area, whereby a partition wall construction of random type is used as well as a floor construction for a building structure, such a floor consisting of an underlying bearing construction of for example reinforced concrete and a covering construction arranged thereon.

Known for house and utility building is the raising of a building structure from a bearing construction consisting of for example reinforced concrete with which the floors and bearing walls are formed. This construction can be made of pre-cast elements or cast-in-situ concrete elements.

Further it is usual to arrange the partition walls on the floor areas, which operation may or may not be subject to the wishes of the user. These partition walls may be permanent or movable. All these systems have the drawback that the lines for gas, water, electricity and outlet pipes are fitted later, which involves much extra work with respect to channels to be hacked out and the like. Particularly in the case of prefab building the arranging of the lines demands a coordinated plan because decisions about one system (e.g. floors) are closely linked to decisions about another system. Passageways such as doors are moreover difficult to cross and special provisions have to be made for this purpose. All this makes the building cost comparatively high.

For further finishing the bearing floor is levelled off or covered with a covering construction in which the supply and drain lines have to be accomodated. With intersecting lines this may cause problems because a sufficient separation must be maintained between these lines. This requires much preparatory work such as determining the final arrangement and location of the lines, plotting the many dimensions, including the height dimensions. In addition, the floor and the different types of line are each laid by different tradesmen, which creates a coordination problem.

The invention has for its object to obviate the above mentioned drawbacks and provides for this purpose a method which is distinguished by:
  placing on the floor of duct-like parts in accordance with the previously determined pattern of division,
  the laying of lines of various types in these duct-like parts,
  and the applying up to or close to the duct-like parts and on the rough floor of a finishing layer, whereby the duct-like parts serve as a basis for the partition walls to be placed thereon.

The concept of the invention has as starting point that the lines, which mostly extend along or in the partition walls, must be fitted directly before placing of the partition walls, and at the location where these are to be placed. This has become possible as a result of the duct-like parts which support the partition walls, these parts accommodating the required lines. Crossing at openings such as doors is furthermore easy to perform because the lines can run along beneath the door opening. This makes possible the so-called "closed loop" in a "smart house".

In order to facilitate connecting of the lines to supply and outlet lines it is possible to have the covering layers of the floor provided with groove channels that are recessed out of it. These groove channels usually cross the partition walls and duct-like parts and therefore lines to be arranged in them so that easy connections can be carried out at the intersections.

The invention further relates to a method for laying out a space of which the dimensions along two horizontal axes re defined by a longitudinal and transverse edge of a rough floor of a building construction.

With such a method the starting point up to the current time has been the marking out of determined marker points on the covering construction of the rough floor, such marker points being used for placing of the upright parts in the space. These upright parts are for example partition or dividing walls, which normally have to be placed according to a pre-determined drawing plan. The inhabitant or user of the space has relatively little say in this matter, because the desired changes entail difficulties in system building.

The invention has for its object to improve the above mentioned method such that each desired layout becomes possible without the demands of system building being disregarded.

The method distinguishes itself in that tile-shaped elements of predetermined dimensions are arranged on the floor in rows running parallel to a reference line that is determined beforehand by means of the system of co-ordinates, the upper surface of these elements being provided with markings, such as the peripheral edge or a relief, such that the markings on the elements together form a matrix, and in that upright elements such as partition walls are placed in accordance with the markings in the matrix.

The tiles are preferably laid abutting against one another in order to obtain a very fine-mesh matrix.

It is also possible to carry out the above stated method using the above mentioned tiles provided with an upper surface having grooves arranged in a grid pattern, which grooves provide together with the other tiles the very fine-mesh character of the matrix.

Additional lines can in accordance with the invention also be accommodated in the finishing layer.

In all the above mentioned methods the finishing layer can have a dual function. On the one hand for the finishing of the floor, as is normal, but also for enclosing the duct-like parts at the sides, so that these are a solid basis for the partition wall to be placed on them.

Further the invention has for its object tile-shaped elements having recesses on the top and/or bottom for passage of lines and the like.

The advantage of the tile-shaped elements is not only that the lines can be easily placed where determining of their position is concerned, but also that supply and drain lines are placed on different levels, making it possible for the lines to cross one another without problem.

If a change is made to a detachable covering layer in the form of sheets which can be attached to the tiles, repair work can then also be carried out in a relatively simple manner, because the covering layer and the tile layer only have to be removed locally. Later placing and/or changing of lines remains possible without much breaking being necessary.

If the recesses on the upper face of the tiles are also used for attaching the upright parts, for example partition or dividing walls in the space to be laid out on the floor, it is recommended that the recesses in the upper face are arranged as grooves according to a grid pattern.

The invention relates further to a member for a duct-like part that can be used for the above stated methods.

Such a channel member is distinguished according to the invention by at least one upright body part provided with a horizontally extending flange portion along the upper and lower edge thereof. The body part determines the height of the duct-like part and therefore the height above the unfinished floor area at which the partition wall begins. The lower flange portion ensures a stable support for the body part on the floor area while the upper flange portion forms a good basis for the partition wall to be placed.

In one embodiment the flanges can both run in the same direction relative to the body part so that a duct opening to the side is formed. In this way access to the lines can still be gained, also after placing of the partition walls, so that repairs, replacement and the like are possible.

In a further embodiment two body parts are attached against each other, resulting in the formation of two ducts opening to either side. Lines can in this way be laid on either side of a partition wall and remain accessible afterwards.

In another embodiment two body parts are arranged at an interval from each other and the flanges are connected to each other to form a tube part. These tube parts can be arranged at a distance from each other in order to enable later accessibility of the lines and to form passages for accommodating of auxiliary material such as wall junction boxes.

In accordance with yet another embodiment at least the body parts can be manufactured of intersecting rods for the forming of a gabion-like duct.

In addition the invention relates to a channel member for the forming of a sill or the like which extends between two duct-like parts at the sides of an intended passage through the partition wall. This sill element preferably has a U-shaped cross section. As a result of such passage of the lines below floor level the required "closed loop" of lines can be achieved in a simple manner. All elements have preferably an adapted lower portion in order to obtaining a cooperation with the recesses in the covering struture, as the tile floor.

These and other features of the invention will be further elucidated in the figure description following hereinafter with reference to a number of embodiments.

Figure 2:
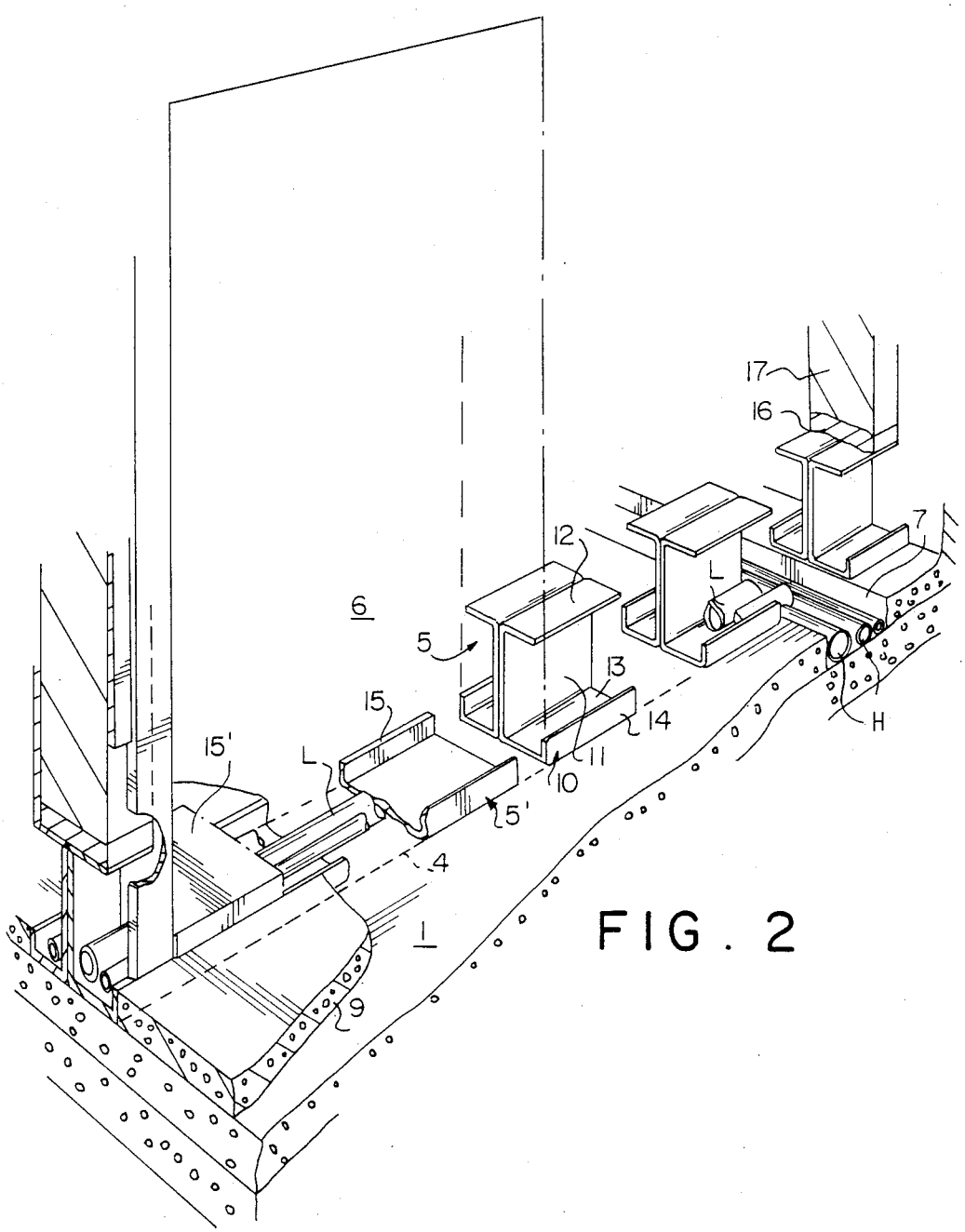
Figure 3:
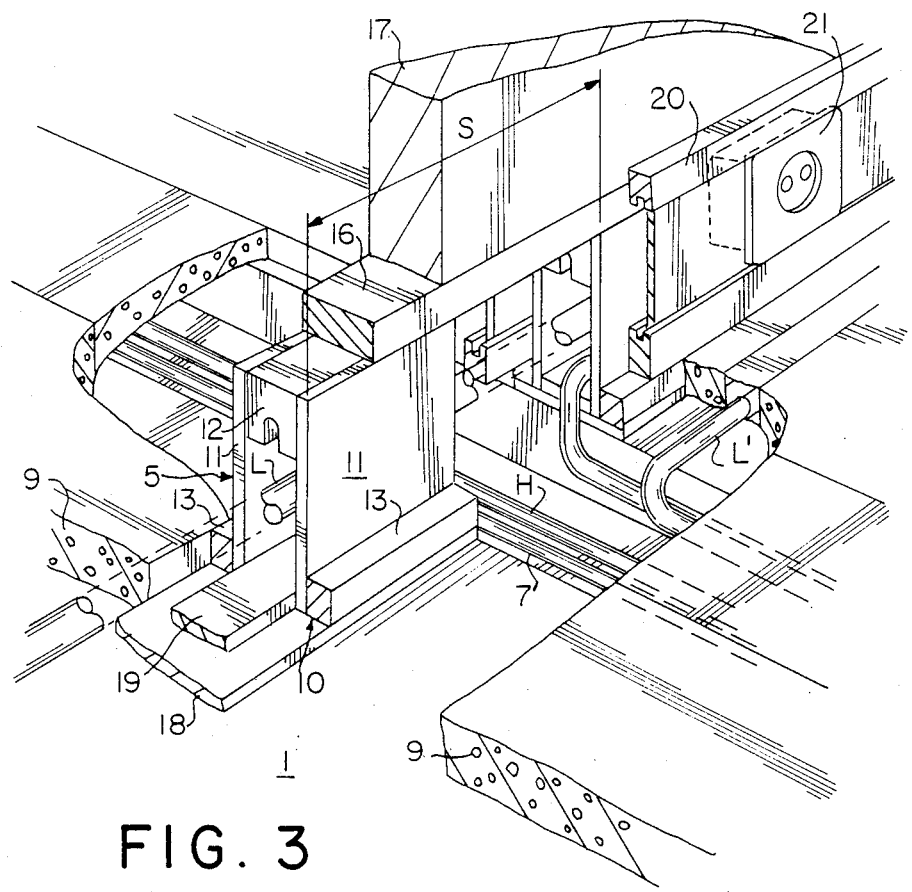
Figure 4:
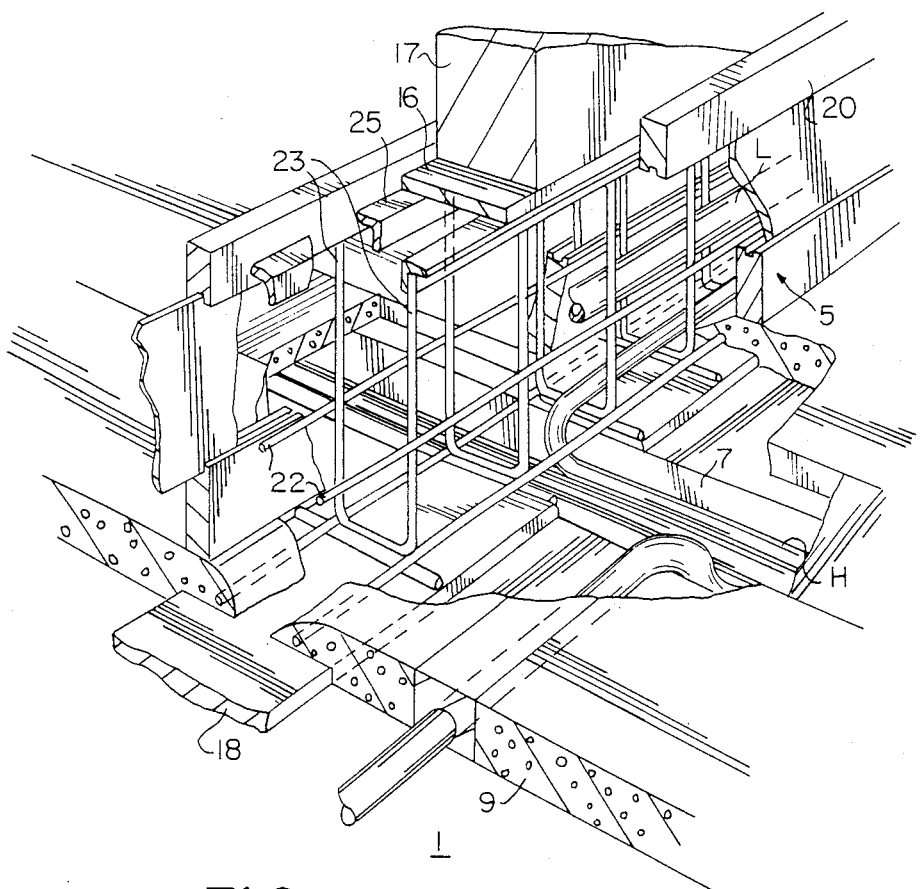

In the drawing:

FIG. 1 shows a perspective view of a part of a building provided with an upright bearing construction having floor levels extending between, FIG. 2 is a perspective top view of a part of a floor area having placed on it members for duct-like parts and a partition wall as according to a first embodiment, FIG. 3 and 4 each show perspective views of a floor level corresponding to FIG. 2 with respectively a second and third embodiment of the members for duct-like parts.

Figure 5:
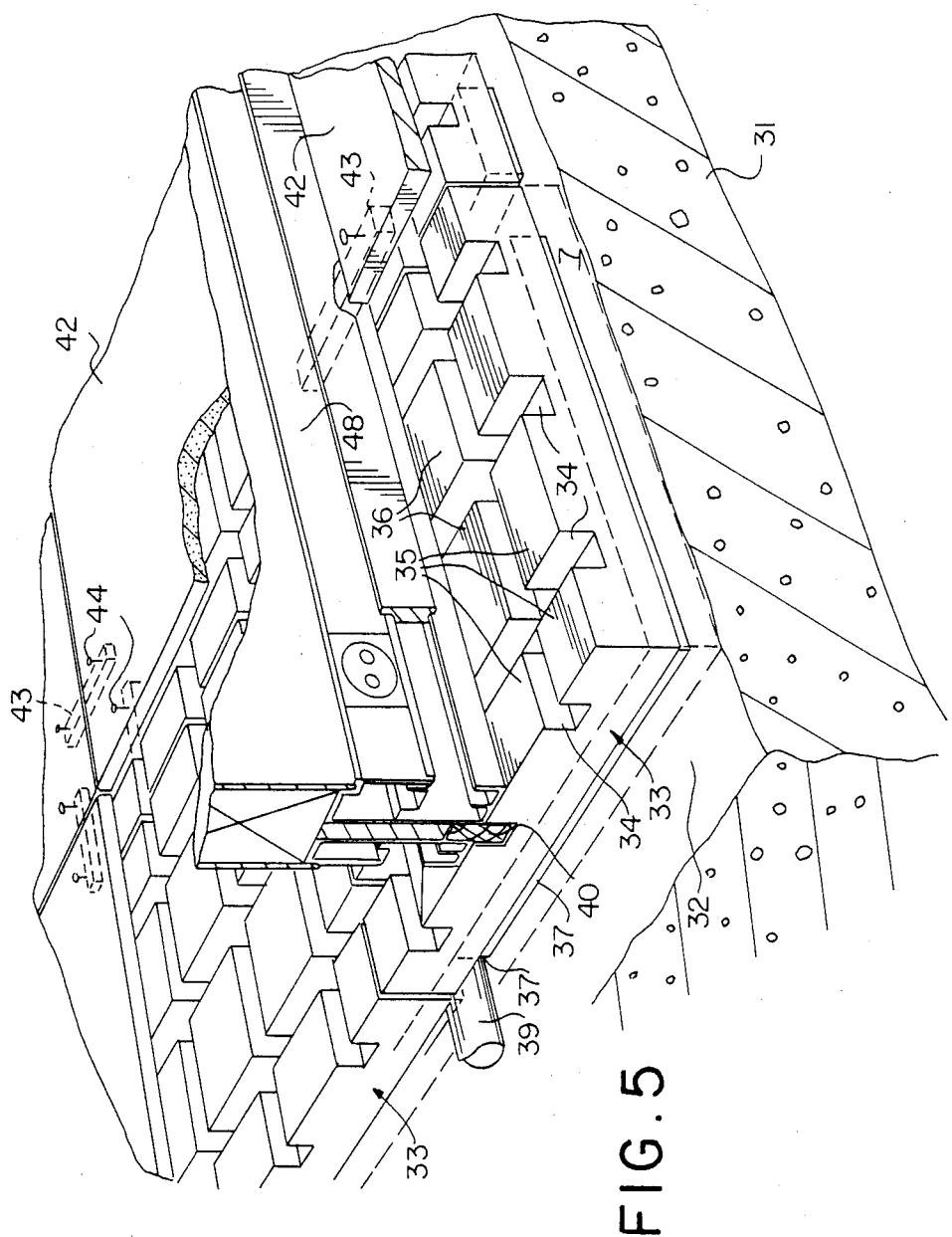
Figure 6:
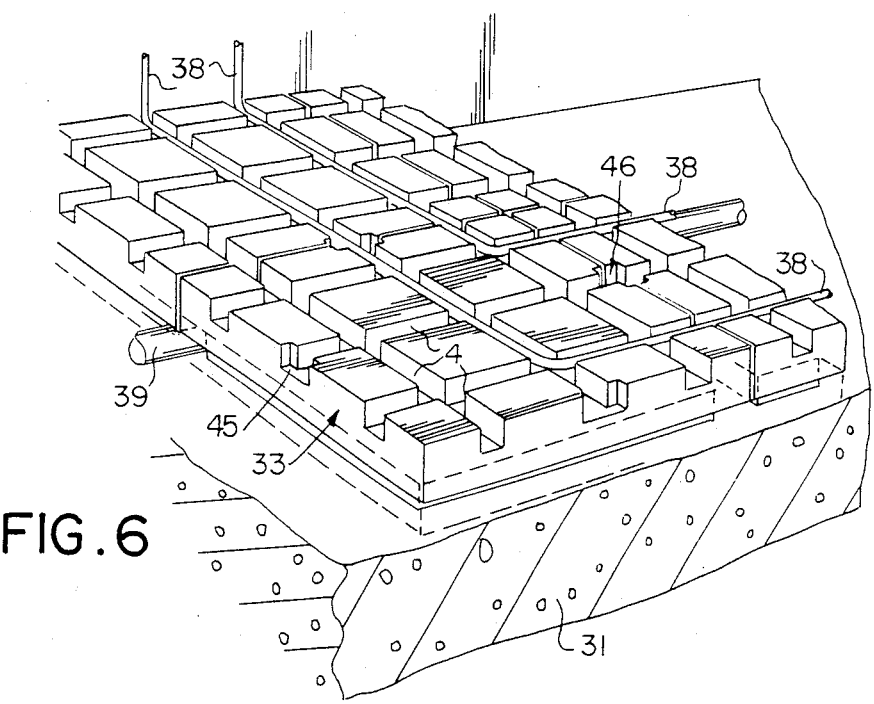
Figure 7:
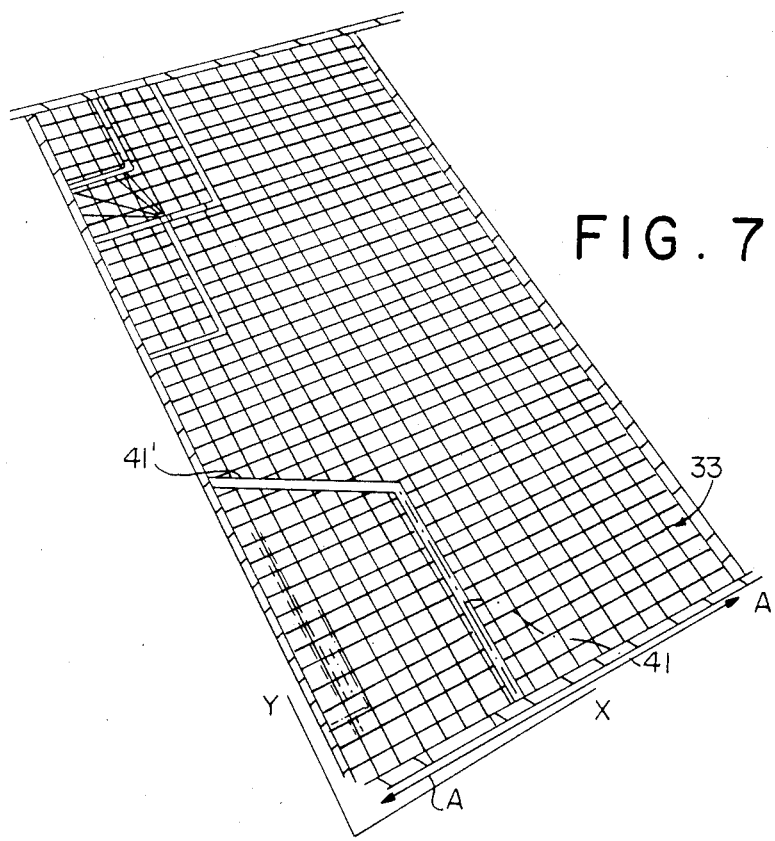
Figure 8:
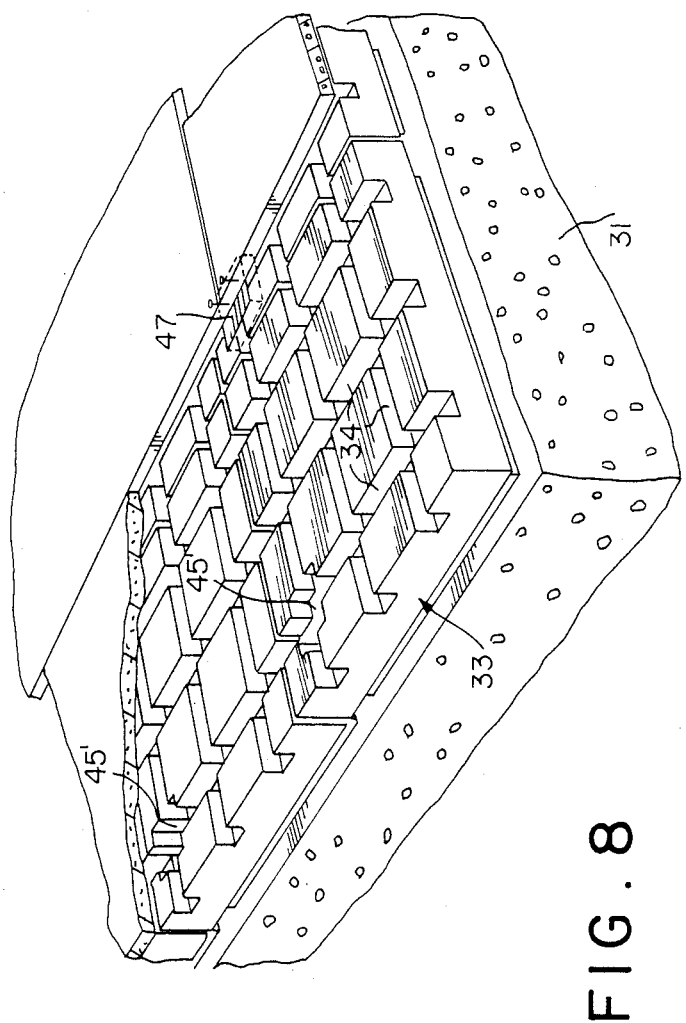

FIG. 5 shows a perspective top view of a part of a floor construction having the covering construction according to the invention arranged thereon, FIG. 6 shows a perspective top view of a complete floor having tiles according to a matrix pattern arranged thereon, FIG. 7 is a perspective view corresponding with FIG. 5 of a detail of the tiles in a first embodiment, FIG. 8 shows a perspective top view corresponding with FIG. 7 of a detail of the tiles as according to a second embodiment.

Indicated in the figures with the numeral 1 is the unfinished floor level of, for example, reinforced concrete. Also understood here by the term floor level is the floor of the ground floor and both higher and lower residential or user levels. The construction of the floor area can be of any type, being in prefab form or made from cast-in-situ concrete. Also falling within the idea of a floor area are floors of other materials, such as wood.

The building for residential or utility purposes shown in FIG. 1 is only indicated schematically whereby a side wall 2 is shown and a floor part of the level lying directly above. In addition the rear wall 3 is shown only schematically while the wall located opposite side wall 2 is broken away for the sake of clarity.

It is assumed that the level spaces bounded by the floor areas 1 and walls 2, 3 have to be divided up into smaller rooms, such as for example living room or bedrooms, kitchen, toilet and the like. The arrangement of the living space is pre-determined and this arrangement is marked out on the rough floor 1. This is done by means of lines for instance which are designated in the drawing by 4. These lines define the position of the duct-like parts 5 to be arranged thereon, thus enabling a complete overview of the rooms to be arranged. The duct parts 5 are further explained with reference to the FIG. 2-4. It is noted that at the points where there must be passageways the duct parts 5' take a recessed form.

The partition walls can next be arranged on the duct-like parts 5. The construction of these partition walls may be of random type and fall otherwise outside the scope of the invention. Conceivable here are brickwork, prefab wall panels, or a wooden bearing frame with a random sheet covering, which may or may not be sound-proofing.

Where necessary however the duct-like parts 5 are provided in advance with lines for gas, water, electricity and also for discharge pipes.

In order to obtain an easy connection, floor 1 can be pre-formed with groove channel-like recesses 7 which extend for example along the whole periphery of floor 1, or alternatively, parallel to each other and distributed over the floor surface for example, see groove channels 7' in the upper floor level 1.

Opening into such a groove channel 7 are the exterior lines 8 fitted by the contractor. The desired line system can in this way be disposed in the building in a simple manner, without any hacking or breaking being necessary.

The duct-like parts 5 can finally be fixed in place by applying a screed layer 9, which is shown schematically in FIG. 1 only in the left-hand rear corner. The principal function of the screed layer is however to obtain a "submerged" line system, as a result of which passage beneath floor level at openings is effected without problem.

Various embodiments of duct-like parts will now be explained with reference to the FIG. 2-4.

The duct-like part in FIG. 2 thus consists of a metal part 10 substantially bent into a U-shape, which part consists of a vertically directed standing body part 11 formed along the upper edge with an outward facing flange 12 and on the bottom edge with an outward facing flange 13. In the embodiment shown two such profiles are in each case placed back-to-back so that a substantially I-shaped profile is obtained.

The lower flange 13 is also provided with an upright end edge 14, the function of which is further described later.

Placing of such duct-like parts along the lay-out lines 4 and subsequent adhering in random manner of these parts to the floor 1 results in ducts opening to the outside in which the lines L can be accommodated. Such a duct intersects at some point a groove channel 7 recessed into the floor area 1 and having main lines H arranged therein. Connections can be made at the intersection of lines L and main lines H.

As a result of the laying of screed layer 9 the duct-like parts and profiles 11, and therefore also the lines L, come to lie slightly recessed relative to the top layer of the floor. These lines can in this way be fed underneath a passageway 6 that may be formed, whereby the group of lines at this passageway 6 can be covered off at the top by a hollow sill consisting for example of a U-shaped duct part 15. This duct part opening to the top can be covered off by a sill beam 15'. It is also possible to fit duct part 15 in a reverse manner to that shown. In this way a floor without sills is obtained. The upper flanges 12 serve to accommodate a continuous strip 16 onto which a partition wall 17 can be placed. It will be apparent that after placing of this partition wall 17 the line duct and therefore the lines L remain accessible on both sides of the partition wall. The ducts can be covered off on both sides by a skirting board (not shown).

From FIG. 2 it will be apparent that the height of the upright edge 14 has approximately the thickness of the screed layer 9 so that after applying of screed layer 9 the parts 11 can be completely fixed.

FIG. 3 shows an alternative embodiment, whereby the same parts are designated with the same reference numeral. A duct-like part 10 consists here of two body plates arranged at an interval from each other, whereby the upper flange 12 can be common to both body plates so that finally a reversed U-shaped cross section is obtained. The plate is formed on the underside with an outward facing flange 13 of a height such that the screed layer 9 can come to lie against it.

Duct-like parts 10 are arranged at a determined pitch s from each other so that between the duct-like parts 10 a space is left for keeping accessible the lines L fitted between body plates 11.

In order to obtain a solid construction a supporting layer 18 is laid beforehand on the floor area 1 and on this layer is arranged a batten 19 the width of which corresponds to the width of flange 12, so that the body plates 11 come down on either side of it.

Also shown in the embodiment in FIG. 3 is a groove channel 7 in the floor area having therein the main lines H, which can be connected to the lines L. A line L can also be bent directly into main line 7. Also shown is a line L' accommodated parallel to the duct-like parts 10 in the screed layer, which line continues into groove channel 7 of the floor area. Such a line construction may be necessary due to separating of lines of different types, for instance electricity cables and water pipes.

After the lines are connected and the partition wall 17 positioned, the duct-like parts 11 can be covered on either side by a skirting board 20, the construction of which may likewise be random. Owing to the recesses between the duct-like parts 11, wall junction boxes 21 and the like can be located in the skirting board and replaced later.

FIG. 4 shows a third embodiment whereby the duct-like part consists of a gabion-like construction consisting of longitudinal rods 22 and cross-bars 23. The construction is such that a U-shaped cross section is obtained so that two standing body parts are realized arranged at an interval from each other, connected together at the bottom and reinforced by extra cross-bars 24. These rest on a continuous strip 18 which is pre-fitted on the floor area 1.

Cross-bars 23 are joined to each other at the top by an angle piece 25 of which the horizontal outward facing flange serves as support-surface for the partition wall 17 to be arranged thereon or a pre-laid bearing strip 16.

This embodiment lends itself for pre-laying of the lines L in between the standing cross-bars 23 while the lines L nevertheless remain accessible from the side after placing of the partition wall 17. The connection with main lines H lying in groove channel 7 is here also possible without a great deal of work.

As in the previously described embodiments the duct-like part is covered at the side by a random skirting board 20.

It will be apparent that in this embodiment the screed layer 9 can also fix duct-like part 5 in position.

The floor construction shown in FIG. 5 consists of a supporting floor 31, which is manufactured, cast or prefabricated in advance in the building structure (not shown). The bearing construction 31 may be of any random dimensions and is considered to fall outside the scope of the invention.

According to the invention tiles 33 are arranged on the flat or, if required, levelled off upper surface 32 of the supporting floor, such tiles having predetermined dimensions. The tiles lie in rows parallel to a reference line A—A (as in FIG. 7), which is predefined in a co-ordinate system X-Y determined by a longitudinal and transverse edge of the rough floor. The line A—A may also run diagonally.

The tiles are rectangular and preferably square. It is to be understood that FIGS. 5-8 as well as FIGS. 1-4 are directed to configurations in which the partition walls are an important part of the invention. That is to say, an over-riding feature of the invention in all embodiments thereof is the use of structural walls such as the walls 2 and 3 shown in FIG. 1 which are to be sub-divided into smaller rooms by means of interior partition walls. In FIG. 1 the partition walls are provided along the duct-like parts 5. In FIG. 5 the partition walls 41 are provided atop the duct-like parts 48 and this construction is likewise contemplated in FIGS. 6 and 8 and is further illustrated in FIG. 7 at 41 and 41'. The upper face of each tile is provided with recesses, here in the form of intersecting grooves 34. The grooves shown are laid such that the raised parts lying between them again form a regular pattern, whereby they are disposed over the surface such that the raised parts 35 along the edges together with the parts of the adjoining tile will have the same dimension as the raised parts 36 located inside.

The tile is formed on the bottom with a recess 37, which preferably extends along the periphery thereof.

Laying of the tiles 33 against one another therefore creates from the grooves 34 continuous channels on the upper side and channels on the underside made up of the recesses 37. The channels at the top may be used for laying of lines 38, for example water pipes and electricity cables, which are separated from each other by the raised parts 36 of the tiles. On the underside outlet lines 39 may be arranged, from which is apparent that the crossing of supply and drain lines takes place on different levels, which enables system building to be carried out more easily.

If the drain line 39 is larger in diameter than the inner periphery of the channel formed by the recesses 37, an edge strip of the tile can then be easily removed owing to the small thickness between the edge groove 34 and the recess 37 in the tile.

Grooves 34 may also be used for arranging attachment means 40 for the upright parts, for example a partition wall 41 as illustrated in FIG. 5. The attaching parts 40, for example in the form of wooden blocks, may be arranged in advance at the place where a partition wall 41 is planned. Subsequently a foot part of the wall 41, for example in the shape of a skirting construction 48 (see FIG. 7), may be laid on blocks 40, without additional work for the dimensioning thereof being necessary. A very fine-mesh matrix is in any case formed by the grooves 34, making it possible to determine the dimensioning of the area to be laid out above the floor in a simple manner during construction, without it being necessary to carry out additional measurements. Not only does this reduce mistakes during measurement, it also considerably accelerates the building process. In addition, the location of the partition walls 41 can be easily determined per space in accordance with the wishes of the future user, even during construction. In this way systematic construction is maintained without difficulty. The same applies to alterations in the layout which may be desired at a later stage. It is noted that the walls need not necessarily run along the grooves, but may also enclose an angle with them (see 41').

After the partition walls 41 in FIG. 7 have been placed on the tiles, a covering layer 42 can be fitted, which is shown here in the form of sheets of any desired material. These sheets too can have standard dimensions and are laid unattached on the tiles 33. The sheets can be fitted to one another along their edges by means of connecting strips 43, which are let into the grooves 34 beforehand. The sheets are subsequently attached onto the strips 43 by means of nails 44.

Owing to the continuous groove 34 under the partition wall 41, continuous strips 43 can also be arranged under partition wall 41, onto which strips the covering layer 42 can be nailed down in order to prevent flapping up along the edges of the room.

In an embodiment of the tiles as according to FIG. 7 and 8, the grooves 34 are widened locally at 45 such that when the tiles 33 are laid against one another (see FIG. 7 ), a recess in the form of a square or rectangle (see at 46) is obtained. In this recess a block can be inserted which may serve as a connection for four corner points of the sheets in the covering layer 42 by nailing of these corners to the block. It is on the other hand possible to use the recess for auxiliary material, e.g. junction boxes and the like, for the lines to be placed in the recesses. In the embodiment according to FIG. 8 the square recess 45' has been arranged in the tile itself, into which is inserted the associated block 47 for nailing.

Such an embodiment makes it possible to determine the position of the tile 33 relative to the space owing to the asymmetrical location of the recess 45', so that when the tiles are laid correctly, a main measurement of the matrix obtained can be determined in a simple manner. This makes it easier to determine the measurements required.

The invention is not limited to the embodiments described above. The tile for example need not be square, but may also have a rectangular form. The recess 34 may also take a form different from the grooves shown. The number of grooves per tile may deviate from that which is drawn. Finally, the tiles need not lie abutting one another, but some distance may also be maintained between them.

We claim:

1. The method of building construction, which comprises the steps of:
    forming a building framework including a supporting floor having a slab-like layer disposed in spaced relation above the bottom surface of the floor, said layer having horizontal grooves in its lower surface and horizontal grooves in its upper surface so that the grooves in the lower surface and the grooves in the upper surface are adapted to receive lines or conduits of different kinds;
    laying a line of a first kind in a horizontal groove of said lower surface, laying a line of a second kind in a first horizontal groove of said upper surface, and laying a line of a third kind in a further horizontal grove of said upper surface so that said lines of said second and third kink pass over said line of a first kind;
    said horizontal grooves in said upper surface being orthogonal to each other to define a grid and said lines of said second and third kind being routed within said grid.

2. The method as defined in claim 1 wherein said slab-like layer is divided into a plurality of contiguous tiles, said grooves in said lower surface extending circumferentially of each tile.

3. The method as defined in claim 2 including a step of erecting duct-like parts atop said tiles and erecting partition walls atop said duct-like parts.

4. The method of constructing a building having different categories of utility lines at multiple, separated vertical levels in the same floor structure whereby the utility lines may be installed in orderly sequence of different levels without interference in routing among the lines, which comprises the steps of:
    providing a building structure having a horizontal, sidewall-surrounded load-bearing floor layer presenting an upper surface level and a lower surface level, and defining an occupancy area;
    providing at least a first channel in said floor layer so as to lie between said upper surface level and said lower surface level;
    providing a first category of utility lines within said first channel so that any such utility line is disposed at a level below said upper surface level;
    providing a layout of partitioning ducts on the load-bearing floor layer with the layout defining selected rooms in accord with a freely selected layout of rooms within the occupancy area;
    providing interruptions in said partitioning ducts at door openings to the rooms;
    providing a further category of utility lines within at least one of said partitioning ducts so as to be at a level which is above said upper surface level;
    providing a covering layer of finite thickness on the upper surface of the load-bearing floor layer to form sides of sill recesses bounding the interruptions;

lengthwise bridging the sill recess of said at least one of said partitioning ducts with the further category of utility lines;

covering the sill recesses; and providing partition walls atop said partitioning ducts to close off said rooms.

5. The method as defined in claim 4 including the steps of providing said partitioning ducts with open sides whereby utility lines disposed therein are exposed to access, and ultimately covering the sides of said partition ducts.

6. The method as defined in claim 4 wherein said first channel opens onto said lower surface level and defines a first channel pattern and including the steps of providing a second channel pattern in said layer opening onto said upper surface level and providing a category of utility lines within said second channel pattern so as to lie at a level which is above the level of the first channel pattern but below said upper surface level.

7. The method as defined in claim 6 including the step of laying tiles on said floor structure to form said load-bearing floor layer, said tiles having said first channel patterns in their bottom surfaces and said second channel patterns in their top surfaces.

8. The method as defined in claim 7 including the steps of providing said first category of utility lines to include sewage lines in a layout on said floor structure compatible with said first channel pattern and laying said tiles onto said floor structure to receive said layout of sewage lines within said first channel pattern thereof; providing the utility lines within said second channel pattern to include water lines; and providing said further category of utility lines as electrical lines; and only then covering said floor layer and said sill openings.

9. The method as defined in claim 8 wherein the step of providing the layout of partitioning ducts comprises locating a tongue of each partitioning duct in a channel of said second channel pattern.

10. The method as defined in claim 9 wherein said floor structure is the floor of a large building and including the step of subdividing such floor into a plurality of units each surrounded by its own walls and including the step of laying out the partitioning ducts differently in at least some of said units.

11. The method as defined in claim 4 wherein said floor structure is the floor of a large building and including the step of subdividing such floor into a plurality of units each surrounded by its own walls and including the step of laying out the partitioning ducts differently in at least some of said units.

12. The method of building construction, which comprises the steps of:

forming a building framework including a slab-like floor layer having an upper surface defining a habitable area, said layer having at least one horizontal groove opening onto its lower surface;

providing a pattern of duct-like parts on said layer in accord with an arbitrarily selected room layout in said habitable area;

providing utility lines required for said habitable area in said horizontal groove below said upper surface as well as in said duct-like parts above said upper surface; and providing partition walls atop said duct-like parts to form rooms.

13. The method as defined in claim 12 including the step of communicating said horizontal groove with at least one duct-like part through said layer and routing a utility line between said horizontal groove and said one duct-like part.

14. The method as defined in claim 12 including the step of providing horizontal groves in the upper surface of said layer and wherein said utility lines are also provided in the horizontal grooves in said upper surface below said upper surface.

15. The method as defined in claim 14 wherein said layer is provided as discrete tiles and including the step of providing a grid of intersecting recesses in the upper surfaces of said tiles to define said horizontal grooves in the upper surface of said layer.

16. The method as defined in claim 15 including the step of providing each tile with a circumferential groove on its bottom surface to define said horizontal groove in the lower surface of said layer.

17. The method of constructing a building, which comprises the steps of:

providing a building structure having a horizontal, sidewall-surrounded load-bearing floor defining an occupancy area;

providing a pattern of horizontally-extending, narrow, and open-sided partitioning ducts of interrupted, finite vertical height on the load-bearing floor with the pattern being in accord with an arbitrarily selected layout of rooms within the occupancy area and with the partitioning ducts being interrupted at door openings into said rooms whereby to present sill recesses therealong;

providing utility lines within at least some of said partitioning ducts whereby said lines are exposed for access through the open sides of the partitioning ducts within which they are located and are temporarily exposed within any sill recesses in which they may be located;

providing partition walls atop said partitioning ducts to close in said rooms while leaving said lines exposed;

providing a finish floor covering on the load-bearing floor within the boundaries of said pattern and over said sill recesses; and closing off the open sides of the partitioning ducts.

18. The method as defined in claim 17 including the step of providing said load-bearing floor as a base layer with a layer of tiles defining a grid of intersecting grooves.

19. The method as defined in claim 17 wherein at least one of said utility lines is an electrical line and including the steps of providing electrical outlets in said partitioning ducts and connecting said outlets to said electrical line.

20. The method of building construction, which comprises the steps of:

providing a building floor having a horizontal layer defining an upper surface and a lower surface, said layer having horizontal grooves in its upper surface and at least one horizontal groove in its lower surface so that the groove in the lower surface and the grooves int eh upper surface are adapted to receive utility lines or conduits of different kinds with vertical separation therebetween;

providing a layout of duct-like parts on said upper surface;

providing a utility line of a first kind in the horizontal groove of said lower surface;

providing further utility lines in the duct-like parts and in the horizontal grooves of said upper surface so that said lines of said first kind and said further utility lines are vertically separated; and providing a finish floor layer on the upper surface of the horizontal layer.

21. The method as defined in claim 20 including the step of providing said layer with a grid of intersecting grooves on its upper surface and a network of closed grooves on its lower surface.

22. The method as defined in claim 20 wherein said layout is in accord with an arbitrary layout of rooms within an occupancy area and including the steps of interrupting the duct-like parts at door openings into said rooms whereby to present sill recesses; and providing partition walls atop said duct-like parts so as to close in the rooms.

23. The method as defined in claim 20 wherein said further utility lines are electrical lines and including the step of providing electrical outlets in said duct-like parts and connecting said outlets to said electrical lines.

24. The method of constructing a building, which comprises the steps of:

providing a building structure having a horizontal, sidewall-surrounded load-bearing floor layer presenting an upper surface at a first level and defining an occupancy area;

providing at least one horizontal-extending channel structure in said layer and opening downwardly below said first level;

providing a utility line of a first kind within said channel structure;

providing a pattern of horizontally-extending partitioning ducts of finite vertical height on the load-bearing floor layer with the pattern being in accord with an arbitrary layout of rooms within the occupancy area, said ducts being open-sided above said first level;

providing a utility line of a second kind at a second level above said first level within at least one of said partitioning ducts whereby said line of a second kind is exposed for access through the open sides of the at least one partitioning duct;

providing partition walls atop said partitioning ducts to close off said rooms; and providing a finish floor layer on the upper surface of the load-bearing floor layer.

25. The method as defined in claim 24 including the step of providing a grid of intersecting channels in the upper surface of said layer.

26. The method as defined in claim 25 including the step of providing said channel structure as a network of rectangular channels in the bottom surface of said layer.

27. The method as defined in claim 26 including the step of providing said load-bearing floor layer as a layer of tiles defining a grid of intersecting grooves.

28. THe method as defined in claim 27 including the step of providing said tiles with circumferential grooves, the circumferential grooves being in lower surfaces of the tiles and the intersecting grooves being in upper surfaces of the tiles.

29. The method as defined in claim 27 including the step of locating tongues of said partitioning ducts in the grid of intersecting grooves.

30. The method as defined in claim 29 wherein said utility line of the second kind is an electrical line and including the step of providing electrical outlets in said at least one partitioning duct and connecting said outlets to said electrical line.

31. The method as defined in claim 24 wherein said utility line of the second kind is an electrical line and including the step of providing electrical outlets in said at least one partitioning duct and connecting said outlets to said electrical line.

* * * * *